US007496095B1

(12) United States Patent
Davis (10) Patent No.: US 7,496,095 B1
(45) Date of Patent: Feb. 24, 2009

(54) LOCAL AREA NETWORK EMULATION OVER A CHANNEL BASED NETWORK

(75) Inventor: Arlin R. Davis, Yamhill, OR (US)

(73) Assignee: Intel Corporation, Santa Clara, CA (US)

( * ) Notice: Subject to any disclaimer, the term of this patent is extended or adjusted under 35 U.S.C. 154(b) by 671 days.

(21) Appl. No.: 09/599,000

(22) Filed: Jun. 22, 2000

(51) Int. Cl.
H04L 12/28 (2006.01)
(52) U.S. Cl. .................. 370/392; 370/355; 370/469
(58) Field of Classification Search ............ 370/395.53, 370/395.54, 445, 465, 466, 389, 395.1, 392, 370/393, 395.6, 397, 399, 467, 469, 352, 370/353, 354, 355, 356
See application file for complete search history.

(56) References Cited

U.S. PATENT DOCUMENTS

| 5,633,869 | A | * | 5/1997 | Burnett et al. ............... 370/396 |
| 5,907,676 | A | * | 5/1999 | Fujishiro et al. ............ 709/203 |
| 5,946,313 | A | * | 8/1999 | Allan et al. .................. 370/397 |
| 5,949,783 | A | * | 9/1999 | Husak et al. ................. 370/396 |
| 6,041,063 | A | * | 3/2000 | Povlsen et al. ........... 370/395.53 |
| 6,101,188 | A | * | 8/2000 | Sekine et al. ................ 370/401 |
| 6,163,834 | A | * | 12/2000 | Garcia et al. ................ 711/206 |
| 6,223,149 | B1 | * | 4/2001 | Margulis et al. .............. 703/27 |
| 6,226,297 | B1 | * | 5/2001 | Alexander et al. ........... 370/401 |
| 6,321,276 | B1 | * | 11/2001 | Forin ............................. 710/3 |
| 6,345,055 | B1 | * | 2/2002 | Frick et al. .................. 370/467 |
| 6,490,259 | B1 | * | 12/2002 | Agrawal et al. ............. 370/331 |
| 6,493,345 | B1 | * | 12/2002 | Margulis et al. ......... 370/395.53 |
| 6,493,816 | B1 | * | 12/2002 | Munroe et al. ............... 711/209 |
| 6,542,504 | B1 | * | 4/2003 | Mahler et al. ................ 370/392 |
| 6,545,981 | B1 | * | 4/2003 | Garcia et al. ................ 370/242 |
| 6,578,084 | B1 | * | 6/2003 | Moberg et al. .............. 709/236 |
| 6,611,525 | B1 | * | 8/2003 | Natanson et al. ......... 370/395.53 |
| 6,625,658 | B1 | * | 9/2003 | Oguchi et al. ............... 709/238 |
| 6,643,292 | B2 | * | 11/2003 | Chapman et al. ........ 370/395.52 |

(Continued)

OTHER PUBLICATIONS

William Stallings, "Data and Computer Communications, Fifth Edition", pp. 487-495, 1997.

*Primary Examiner*—Chi H. Pham
*Assistant Examiner*—Kevin Mew
(74) *Attorney, Agent, or Firm*—Kacvinsky LLC (57) ABSTRACT

Each host/node in a network includes a protocol stack (such as TCP/IP), a host channel adapter (HCA) to interface the host to a local network or fabric, and a LAN Emulation (LANE) driver for emulating a LAN network to the protocol stack. Each host in the local network is assigned a global (or legacy) physical address (e.g., a IEEE 802.3 Ethernet MAC address or the like) and a network address (such as an IP address). In addition, the LANE driver maps the global (or legacy) physical address to the local physical address. According to an embodiment, the local physical address is embedded within the global (or legacy) physical address to avoid the use of a specialized ARP protocol. A connection oriented virtual interface (VI) channel is established between a first node and each of the other nodes in the network. The HCA maps the local physical address (e.g., local MAC address) of another node to the VI channel used to communicate with the other node. A standard or legacy ARP message can then be broadcast to the other nodes over the VI channels, and the local physical (e.g., MAC) address of the responding node can be determined from the global or legacy physical address.

26 Claims, 7 Drawing Sheets

U.S. PATENT DOCUMENTS

| | | | |
|---|---|---|---|
| 6,697,360 B1* | 2/2004 | Gai et al. | 370/389 |
| 6,711,167 B1* | 3/2004 | Ikeda et al. | 370/395.1 |
| 6,741,585 B1* | 5/2004 | Munoz et al. | 370/352 |
| 6,856,619 B1* | 2/2005 | Haugseth et al. | 370/389 |
| 7,231,430 B2* | 6/2007 | Brownell et al. | 709/218 |
| 7,242,665 B2* | 7/2007 | Langille et al. | 370/217 |
| 2002/0016926 A1* | 2/2002 | Nguyen et al. | 713/201 |
| 2002/0097730 A1* | 7/2002 | Langille et al. | 370/401 |
| 2005/0058147 A1* | 3/2005 | Regnier et al. | 370/412 |

* cited by examiner

FIG. 1A (PRIOR ART)

VI ARCHITECTURAL MODEL

HOST 202

LOCAL AREA NETWORK EMULATION OVER A CHANNEL BASED NETWORK

FIELD

The invention generally relates to computers and computer networks and in particular to a network emulation over a channel based network.

BACKGROUND

A number of networks are moving towards a connection-oriented arrangement. An example of a connection oriented technology is Asynchronous Transfer Mode (ATM). Another example of a proposed technology that includes a connection-oriented (or channel based) capability is know as the Virtual Interface (VI) architecture, described in the Virtual Interface (VI) Architecture Specification, Version 1.0, Dec. 16, 1997, jointly authored by Compaq Corp., Intel Corp. and Microsoft Corp. While connection oriented technologies offer many advantages, in many instances it is desirable to maintain an interoperability between an existing connectionless technology and the connection-oriented technology. It is also desirable to maintain such interoperability, for example, when transitioning from a connectionless technology to a connection-oriented technology (or network) to allow some existing software and components to be used. The IEEE 802.3 Ethernet Local Area Network (LAN) standard is an example of a common connectionless technology or network.

Current approaches to provide LAN emulation over a connection-oriented network (such as ATM) have a number of disadvantages. One example is Asynchronous Transfer Mode (ATM) LAN Emulation, which is a specification provided by the ATM Forum for the coexistence of legacy LANs and ATM LANs, known as ATM LAN emulation. ATM Forum, "LAN Emulation Over ATM Specification," Version 1.0, 1995. The ATM LAN Emulation specification is discussed in William Stallings, "Data and Computer Communications," pp. 487-495, Fifth Edition, 1997.

As described in Stallings, the ATM LAN Emulation specification proposes the use of a centralized LAN Emulation Service (LES) to perform basic LAN emulation services for nodes in a network, including: to set up connections, to map MAC addresses to ATM addresses. The LES also includes a broadcast and unknown server (BUS) service to provide a broadcast/multicast a packet to plural nodes upon request from a client, and to provide a specialized protocol to allow nodes to learn ATM addresses of other nodes (i.e., by sending a LE_ARP_Request message).

There are a number of disadvantages of such a system. First, by using a centralized LES service, the network is prone to a single point of failure. Furthermore, the ATM LAN Emulation described above requires a separate and specialized address resolution protocol (ARP) protocol which is not compatible with the legacy or existing LAN networks in order to obtain the ATM address of a node corresponding to the node's MAC or LAN address. Moreover, calls through the operating system (OS) kernel requiring multiple buffer copies of data is typically required in many such existing computer systems, which can burden a processor with substantial overhead.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention is limited only by the terms of the appended claims.

The following represents brief descriptions of the drawings, wherein.

DETAILED DESCRIPTION

I. Introduction

According to an example embodiment, a channel based network, which may be based upon the VI architecture (for example), is provided that allows one or more hosts to communicate with one or more remote hosts over a switched fabric of a local network. The underlying network is a connection-oriented network that requires the establishment of a connection-oriented channel between nodes for communication, according to an example embodiment. To avoid multiple buffer copies, the channels between the nodes are virtual interface (VI) channels.

Each host/node includes a protocol stack (such as TCP/IP), a host channel adapter (HCA) to interface the host to the network or fabric, and a LAN Emulation (LANE) driver for emulating a LAN network interface controller (NIC) to the protocol stack (when in fact the host includes a HCA, not a LAN NIC). Each host in the local network is assigned a global (or legacy) physical address (e.g., a IEEE 802.3 Ethernet MAC address or the like) and a network address (such as an IP address). In addition, the LANE driver maps the global (or legacy) physical address to the local physical address. According to an embodiment, the local physical address is embedded within the global (or legacy) physical address to avoid the use of a specialized ARP protocol. The HCA (or a software element on the host/node) maps the local physical address (e.g., local MAC address) of another node to the VI channel used to communicate with the other node.

A legacy ARP protocol can be used to obtain a global physical address of a second node based upon the network or IP address of the second node. After a connection-oriented VI channel is established between a node and each of the other nodes in the local network, the first node can broadcast an ARP request over each other VI channels to the nodes in the network, including the network address (e.g., IP address) of the second node. The second node provides an ARP response identifying its global physical address. The LANE driver of the first node then determines the local physical address of the second node based upon the global or legacy physical address of the second node. The LANE uses the local physical address-global physical address mapping to interface the protocol stack and the host channel adapter (HCA). The first node may then send a message to the second node using the global physical address of the second node. The LANE driver maps the global (or legacy) address to the local physical address, and the HCA (or a software component) maps the local physical address of the second node to the VI channel established between the two nodes.

II. The VI Architecture

One technology supporting an example embodiment of the invention is the Virtual Interface (VI) Architecture. Several legacy transports have been used as standards for many years. The centralized in-kernel protocol processing for data transfers performed by legacy transports, such as the Transmission Control Protocol/Internet Protocol (TCP/IP) prohibits applications from realizing the potential raw hardware performance offered by underlying high-speed networks. The VI Architecture is proposed as an interface between high performance network hardware and computer systems, and is described in Virtual Interface (VI) Architecture Specification, Version 1.0, Dec. 16, 1997, jointly authored by Compaq Corp., Intel Corp. and Microsoft Corp. The VI Architecture was designed to eliminate the buffer copies and kernel overhead for communications associated with such legacy transports that have caused traditional networked applications to be performance bottlenecks in the past.

Figure 1A:
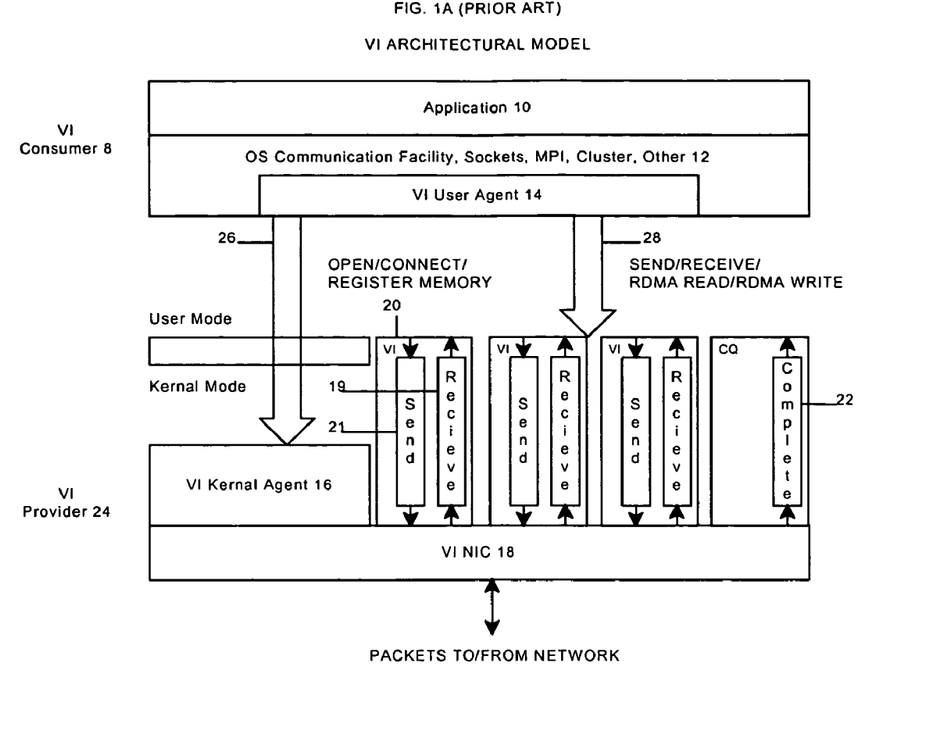
FIG. 1A is a block diagram illustrating a Virtual Interface (VI) architectural model.

FIG. 1A is a block diagram illustrating the VI Architectural model. The VI architecture is a user-level networking architecture designed to achieve low latency, high bandwidth communication within a cluster. VI architecture avoids intermediate data copies and bypasses the operating system to achieve low latency, high bandwidth data transfers.

As shown in FIG. 1A, the VI architectural model includes a VI consumer 8 and a VI provider 24. A VI consumer 8 is a software process that communicates using a Virtual Interface (VI). The VI consumer 8 typically includes an application program 10, an operating system communications facility 12 (e.g., Sockets) and a VI user agent 14. The VI provider 24 includes the combination of a VI network interface controller (VI NIC) 18 and a VI kernel agent 16.

Figure 1B:
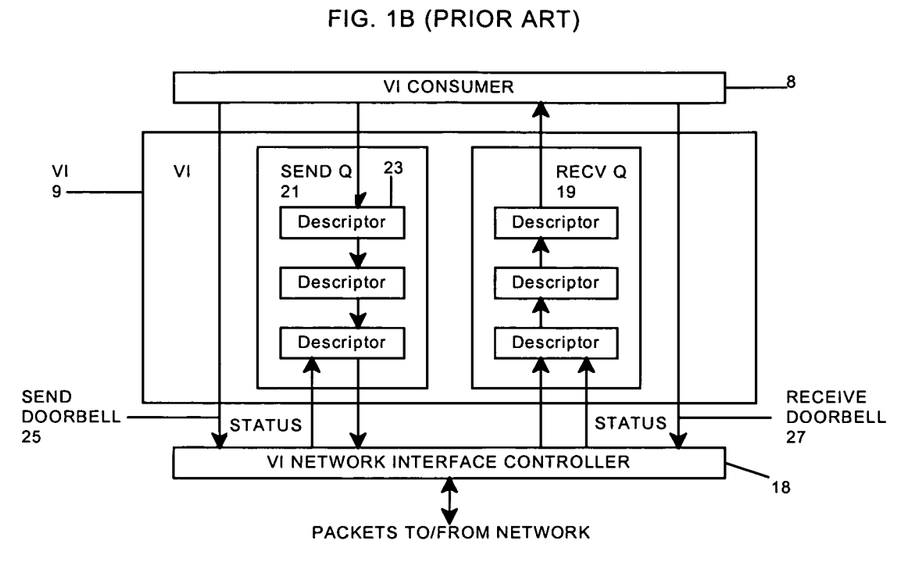
FIG. 1B is a block diagram illustrating a Virtual Interface.

A block diagram illustrating a virtual interface (VI) is illustrated in FIG. 1B. Referring to FIGS. 1A and 1B, a virtual interface (VI) 9 is an interface between a VI NIC 18 and a process or application (a VI consumer 8). The VI 9 allows a VI NIC 18 to directly access the process' (or application's) memory for data transfer operations between the application and the network (i.e., data transfers directly between the application memory and the network without passing through the operating system). The VI 9 includes a pair of work queues, one for send operations (a send queue 21) and one for receive operations (receive queue 19). The work queues store one or more descriptors 23 between the time it is Posted (placed in the queue) and the time it is Done (when the VI NIC has completed processing it). The descriptor 23 is a data structure recognizable by the VI NIC that describes a data movement request, and it includes a list of segments (a control segment, an optional address segment and one or more data segments). The control segment identifies the type of VI NIC data movement operation to be performed (e.g., send, receive) and the status of a completed NIC data movement operation. The data segment describes (or provides an address) of an application data buffer for a VI NIC data movement operation. A receive queue 19 contains descriptors that describe where to place incoming data. A send queue 21 contains descriptors that describe the data to be transmitted. A pair of VIs can be associated (or bound) using connection primitives to allow packets sent at one VI to be received at the other VI. A send doorbell 25 and a receive doorbell 27 are provided for allowing the VI consumer to notify the VI NIC 18 that work (a descriptor describing a requested data transfer operation) has been placed in the send queue 21 and receive queue 19, respectively.

Referring to FIG. 1A again, the VI user agent 14 is a software component that enables an operating system communication facility 12 to use a particular VI provider 24. The VI user agent 14 abstracts the details of the underlying VI NIC hardware in accordance with an interface defined by an operating system communication facility 12. The VI user agent includes a library of primitives that provide functions for creating a VI, for destroying a VI, for connecting one VI to another, to post descriptors (to place a descriptor in a work queue), etc.

The kernel agent 16 is the privileged part of the operating system, usually a driver supplied by the VI NIC vendor, that performs the setup and resource management functions needed to maintain a virtual interface between VI consumers and VI NICs. These functions include the creation/destruction of VIs, VI connection setup/teardown, interrupt management, management of system memory used by the VI NIC and error handling. VI consumers access the kernel agent 16 using the standard operating system mechanisms such as system calls. As shown by arrow 26 (FIG. 1A), the OS communication facility 12 makes system calls to the VI kernel agent 16 to perform several control operations, including to create a VI on the local system, to connect the local VI to a VI on a remote system (if connection-oriented transfer is desired), and to register application memory. Memory registration enables the VI provider (or VI NIC) to transfer data directly between the registered buffers of a VI consumer and the network (without passing through the OS kernel). Traditional network transports often copy data between user buffers and one or more intermediate kernel buffers. Thus, processing overhead is decreased in the VI architecture because data transfers are performed by the NIC by moving data directly between the registered application buffers and the network without making intermediate kernel copies and without making system calls to the OS kernel.

After creating a VI on the local system of host, connecting the local VI to a remote VI (if a connection oriented data transfer is desired), and registering memory, application 10 or operating system communication facility 12 can use data transfer primitives of VI user agent 14 to send and receive data. The VI architecture defines two types of data transfer operations: 1) traditional send/receive operations; and 2) Remote DMA (RDMA) read/write operations. Once a connection is established (if a connection is desired), the OS communication facility can post the application's send and receive requests directly to the local VI (to the send and receive queues). A consumer 8 posts descriptors (e.g., places descriptors in a work queue) then rings a doorbell to notify the NIC that work has been placed in the work queue. The VI NIC 18 then processes the descriptor by sending or receiving data (directly between application memory and network without kernel processing), and may then notify the VI consumer 8 of the completed work using the completion queue 22. VI architecture does not provide for transport level services, including segmentation and reassembly, flow control, buffer management, etc., nor does VI specify many of the details for performing the data transfers.

III. An Example Channel Based Network

Figure 2:
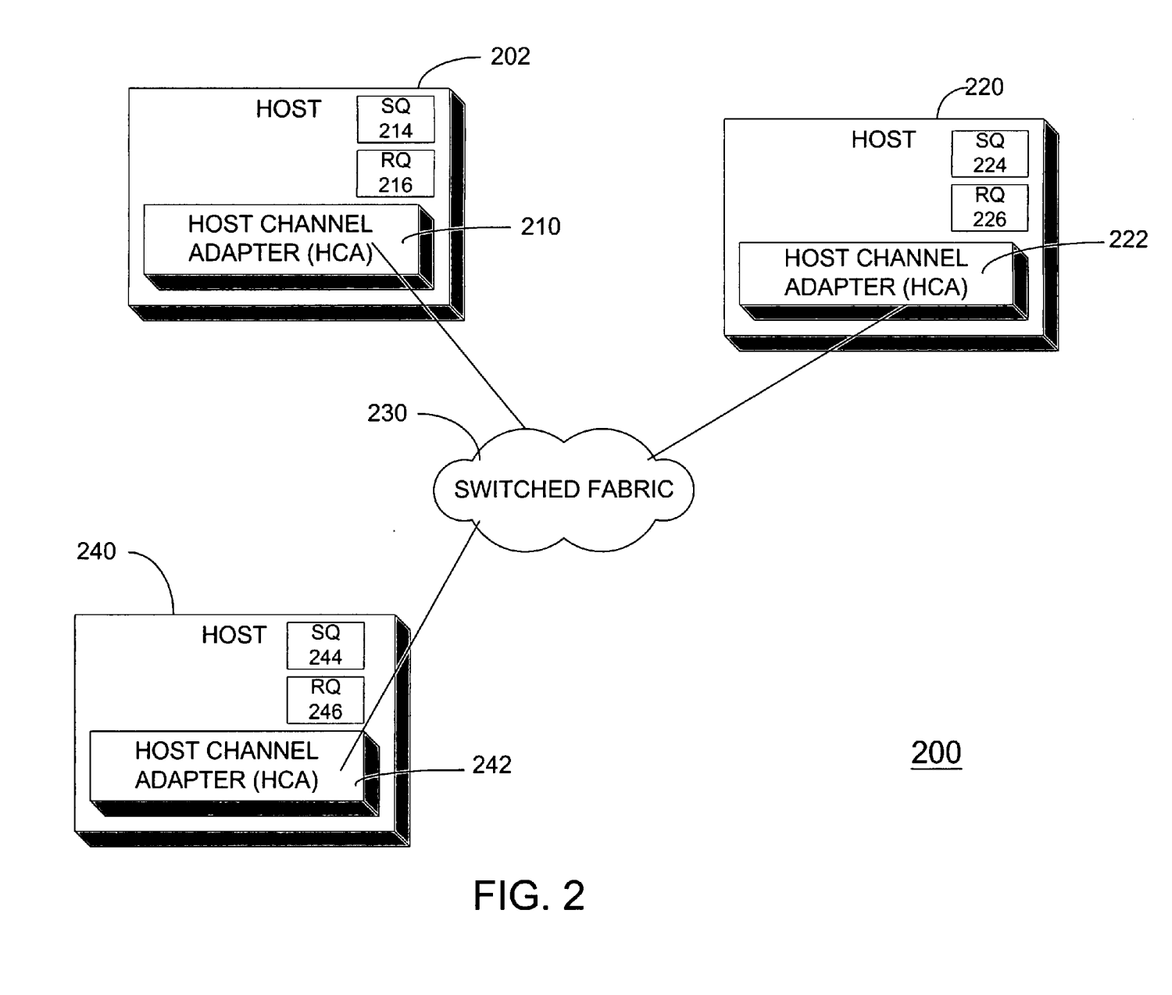
FIG. 2 is a block diagram illustrating an example channel based network according to an example embodiment.

FIG. 2 is a block diagram illustrating an example channel based network according to an example embodiment of the present invention. According to an example embodiment, the channel based network 200 allows one or more hosts or other computing devices to communicate with one or more other hosts or nodes. Although not shown, each host may also communicate with one or more fabric attached I/O units (each I/O unit including one or more I/O devices). According to an embodiment, the channel based network 200 includes one or more hosts including host 202, host 220 and host 240. The hosts are coupled together over a switched fabric 230. The switched fabric 230 includes one or more switches coupled together via communication links.

According to an embodiment of the invention, the channel based network 200 (FIG. 2) is based upon or similar to the Virtual Interface (VI) Architecture. As such, the channel based network 200 includes many of the features and advantages of the VI architecture. According to an embodiment of the channel based network 200, a pair of work queues (i.e., a send queue and a receive queue) are preferably provided at each host or node of the channel based network 200. The work queues allow for direct data transfers between the node's registered memory regions (or buffers) and the network without system calls to the OS kernel and without making kernel buffer copies, as described above regarding the VI architecture. Memory regions/buffers can include volatile and non-volatile memory, storage devices, I/O devices, network attached devices, etc.

An I/O unit is a node attached to the switched fabric 230 that services I/O requests, and may have one or more I/O devices attached thereto (e.g., including storage devices, network devices, I/O devices). A host is a computer, a server, or other computing device on which a variety of software or programs may run, including an operating system (OS), OS communications facilities, application programs, etc. One or more programs running or executing on a host (such as a device driver or application program) may initiate a request for I/O services, which will be serviced by an I/O node. In addition, hosts may communicate with each other over the switched fabric 230, transfer data to each other, service I/O requests from another host, etc.

Each host or I/O unit includes a channel adapter for interfacing to the switched fabric 230. A channel adapter includes the logic and/or control that allows nodes to communicate with each other over a channel (or over the switched fabric 230 within the channel based network 200). Each channel adapter includes one or more ports, with each port typically having a unique address (e.g., a unique media access control address or MAC address).

According to an example embodiment, a host includes a host channel adapter (HCA) for interfacing the host to the fabric 230, while an I/O unit includes a target channel adapter (TCA) for interfacing the I/O unit to the fabric 230. As shown in FIG. 2, host 202 includes a HCA 210 and host 220 includes a HCA 222, while host 240 includes a HCA 242.

Each host (and I/O unit) includes a work queue pair (or a virtual interface) including both a send queue and a receive queue for posting descriptors for the purpose of sending and receiving data, respectively, over the switched fabric 230. For example, host 222 includes a send queue 214 and a receive queue 216, host 220 includes a send queue 224 and a receive queue 226, and host 240 includes a send queue 244 and receive queue 246.

Figure 3:
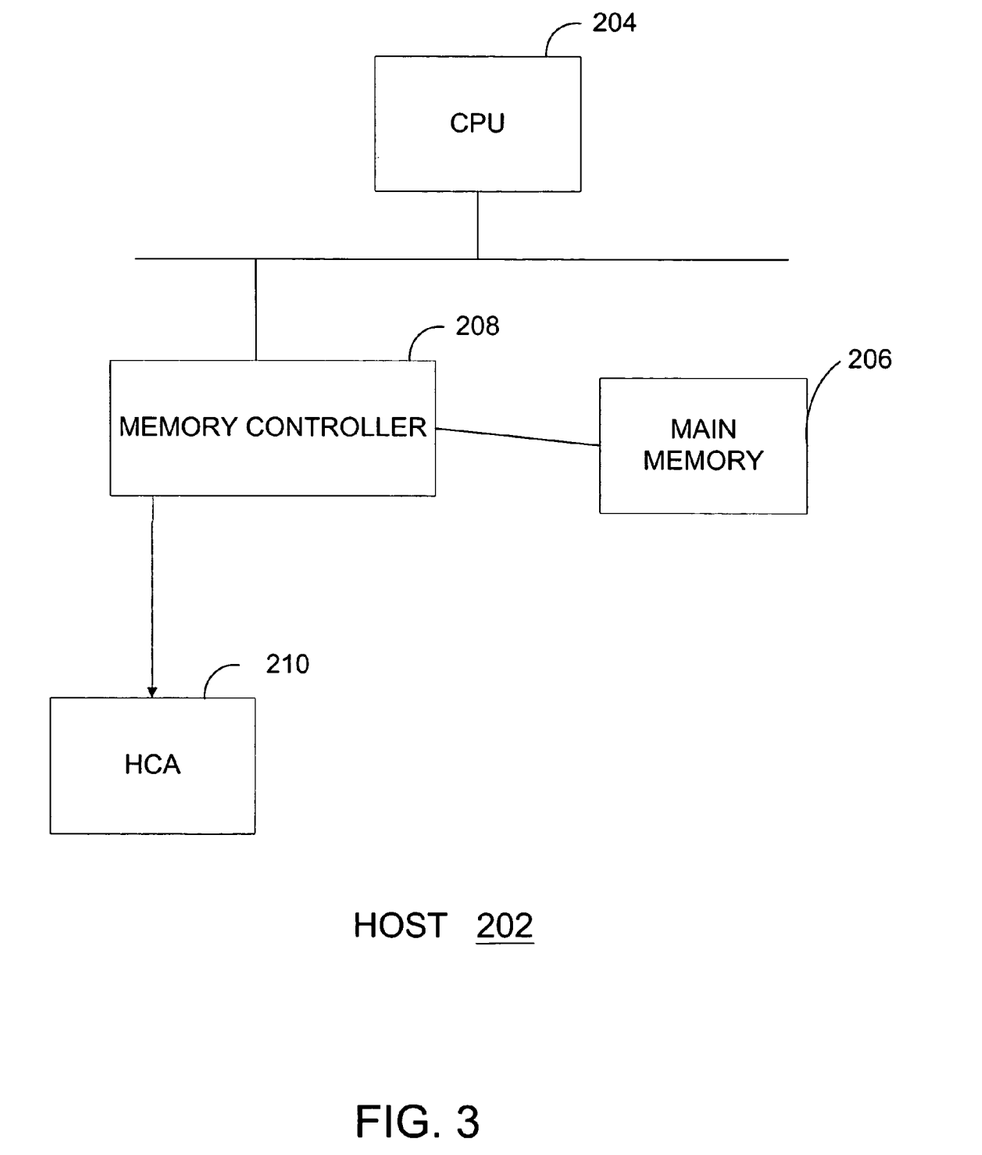
FIG. 3 is A block diagram illustrating a block diagram illustrating a hardware configuration of an example host according to an example embodiment.

FIG. 3 is A block diagram illustrating a block diagram of a hardware configuration of an example host according to an example embodiment. Host 202 (as an example host) may include, for example, a processor (or CPU) 204, memory 206 (such as Dynamic Random Access Memory or DRAM) and a memory controller 208, a computer display, pointing devices (e.g., mouse and keyboard) and other components typically provided as part of a computer or server.

According to an embodiment, one or more applications and other programs (application programs, operating system, I/O device drivers, etc.) running on a host or an I/O unit may operate as a VI consumer, while each connected channel adapter (i.e., HCA or TCA) may operate as a VI NIC 18 (see FIG. 1A).

According to one embodiment, the term "channel based network" may refer to a network in which data transfers are performed directly between registered buffers or memory regions (e.g., registered application buffers of a host) and the network without making kernel buffer copies, similar to the VI architecture. (An additional copy of the data may also be made at the NIC level or by the channel adapter).

Therefore, according to an embodiment, hosts each may include a work queue pair, including a send queue and a receive queue (as described above for VI). These queues may take many different forms. According to an example embodiment, a host node (e.g., host application program or host driver) places descriptors into send queues for a send operation (or into receive queues for a receive operation), and then rings a doorbell to notify the HCA that work has been placed in the work queues. The HCA then sends or receives the data over a channel. For example, for a send operation, the HCA generates one or more packets containing the data from the host's registered buffer(s) described by the descriptor as a payload. The one or more packets are then sent over the channel (e.g., over the network 200, including over the switched fabric 230) to the destination node and destination work queue pair.

The behavior of a channel depends on two attributes, the acknowledge and connection attributes. If the acknowledge attribute is set, then a descriptor is not completed until an acknowledgement is returned. If this acknowledge attribute is not set, then the no acknowledgement is sent and the descriptor is completed when the packet is sent onto the wire or transmission media of switched fabric 230. When the connected attribute for a channel is set (i.e., a connected or connection-oriented VI channel), the two work queue pairs (e.g., a queue pair at one host and a queue pair at another host) are bound together or associated at either end of the VI channel. Therefore, according to an example embodiment, all data sent from one send queue is directed to the connected receive queue. If the connected attribute is not set (meaning a connectionless data transfer or connectionless channel), then communicating work queue pairs are not bound together, and a node can send/receive packets to/from any work queue pair. In such case, because the two ends of the channel are not bound together, the descriptor that is posted for the data transfer (e.g., for a Send) is typically required to include a field that specifies the destination (e.g., MAC address and work queue pair number of destination).

A work queue pair sends and receives data from another work queue pair over a channel. Each channel is bidirectional and can send and receive packets. If data to be sent in a packet is too large, the packet will be segmented into multiple cells (segmentation and reassembly performed by channel adapters and typically only for connection oriented channels). According to one embodiment, only single cell packets can be sent in a connectionless channel. Also, segmentation and reassembly is typically not provided by the channel adapter (HCA) for connectionless channels when a packet exceeds a predetermined size (this function must be provided in software if connectionless service is used). The HCA automatically performs segmentation and reassembly for connection-oriented service.

IV. An Example LAN Emulation Over a Channel Based Network

Figure 4:
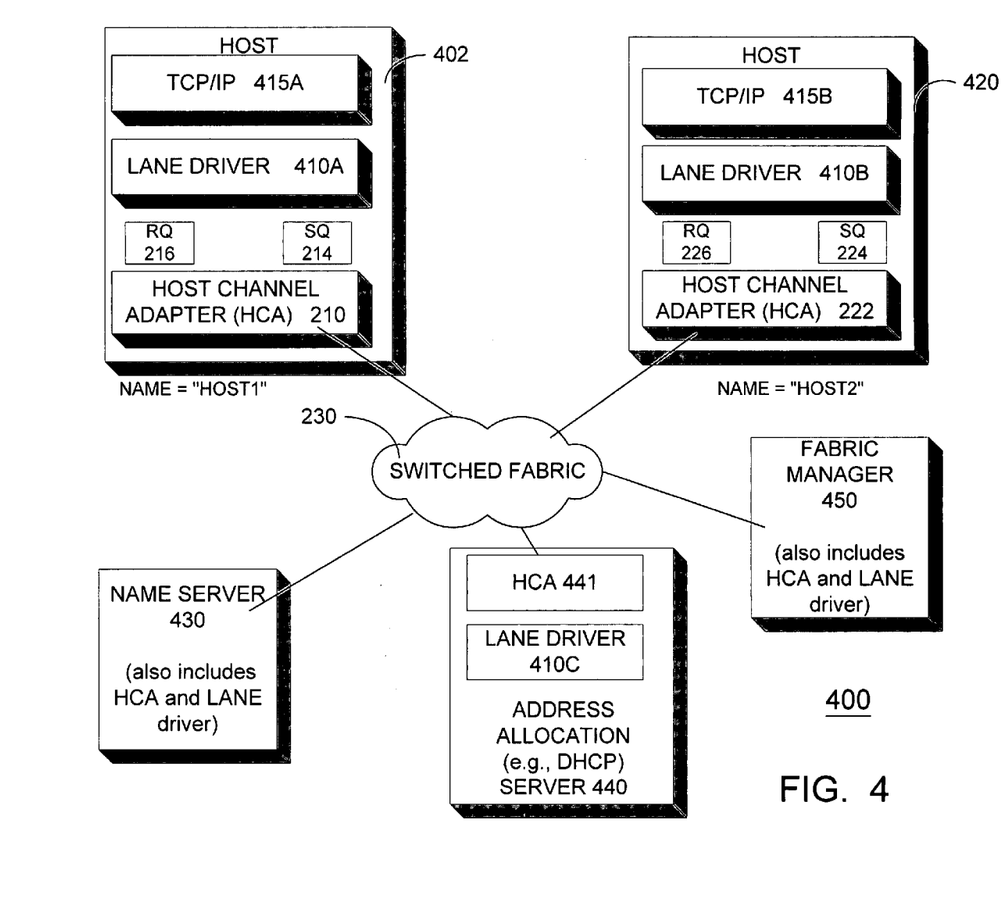
FIG. 4 is a block diagram illustrating an example network emulation over a channel based network according to an example embodiment.

FIG. 4 is a block diagram illustrating an example network emulation over a channel based network according to an example embodiment. Network 400 includes a plurality of nodes or hosts coupled together via a switched fabric 230. The hosts include a host 402 and a host 420. While network 400 may include any number of nodes or hosts, only these two hosts are shown for simplicity. Hosts 402 and 420 (FIG. 4) are similar to hosts 202 and 220 (FIG. 2) in that they include send queues (214, 224) and receive queues (216 and 226), and also include a host channel adapter (HCA) 210 and 222, respectively.

According to an example embodiment, hosts 402 and 420 include a protocol stack. According to an example embodiment, the protocol stack includes a Transmission Control Protocol/Internet Protocol (TCP/IP) stack, shown as TCP/IP stack 415A for host 402 and TCP/IP stack 415B for host 420 (FIG. 4). In a common arrangement, the TCP/IP stack interfaces to a 802.3 Ethernet LAN network interface controller (NIC) (or some other existing network technology). However, according to an example embodiment, rather than providing a LAN NIC, the hosts 402 and 420 include host channel adapters 210 and 222. Therefore, a local area network emulation (LANE) driver 410 is coupled between the TCP/IP stack 415 to emulate a LAN to the TCP/IP stack 415. LANE driver 410A is provided for host 402 and LANE driver 410B is provided for host 420.

The LANE driver 410 controls the network traffic between fabric nodes. The LANE driver 410 manages connections and optimizes data flow based on the channel based network architecture. Based on this architecture, according to an example embodiment, the LANE driver 410 can support either connectionless service or connection-oriented service over the fabric 230 of the channel based network 400.

Connectionless service provides the lowest latency service but would require software segmentation and reassembly (including lots of copies) for packets larger than a predetermined size (e.g., maximum cell size of 256 bytes). In many cases, connection-oriented service provides better service (as compared to connectionless service) because segmentation and reassembly is provided in hardware by the HCA.

There are several issues to be addressed in emulating the Ethernet LAN network. In a typical local area network (LAN), a packet transmitted from one node is broadcast or transmitted to all other nodes on the LAN (thus, broadcast or multicast services can be easily provided). An example is where a node broadcasts an Address Resolution Protocol (ARP) request to all nodes on the network providing an IP address and requesting the corresponding 802.3 MAC address.

Broadcast or multicast services are not as easily supported by the architecture of the channel based network 400 (e.g., for the connection-oriented services). To broadcast (or multicast) a message to all other nodes (or hosts) in the channel based network 400, a connection-oriented VI channel must be established between the transmitting host node and every other node on the network. To establish the channel or connection between nodes, a work queue pair on one host is bound to another work queue pair on the other host (work queue pairs at the end points of the VI channel are bound or associated).

According to example embodiments, there are at least a couple of different approaches to provide the connection-oriented VI channels (i.e., the work queue bindings) between nodes in network 400 so that broadcast and multicast services can be performed. According to one embodiment, a separate work queue pair at a node is bound (or associated with) a work queue pair at each of the other nodes in the network (i.e., a many work queue pair to many work queue pair bindings). This provides a connection-oriented VI channel between the host and every other host or node on the network. This process is performed at each of the other nodes to establish a VI channel between each of the nodes in the network (i.e., each node in the local network 400 is connected to each of the other nodes via a connection-oriented VI channel).

One way to avoid multiple data copies for the different VI channels is for the send queues at the node/host to use the same application buffer (or buffer reference) at the sending node for each connection or channel. In this manner, data can be directly copied from a single application buffer across each of the connection-oriented VI channels.

The many-to-many work queue pair bindings approach to establish the multiple VI channels (e.g., to allow emulation of the broadcast or multicast feature of LANs) could use a significant amount of work queue resources (e.g., one work queue pair at the host per VI channel to be established). Thus, according to another example embodiment, a further improvement may involve binding a single work queue pair at a node/host to separate work queue pairs at each other node in the network (a one work queue pair to many work queue pairs bindings). Thus, in this embodiment, one work queue pair at a node is bound with a work queue pair at another node or endpoint. This also establishes VI channels from the host to each of the other hosts/nodes in the network to that broadcast and multicast services can be provided over network 400 as part of the LAN emulation.

Referring to FIG. 4 again, the channel based network 400 includes a name server 430 which resolves or maps host names to network addresses (e.g., IP addresses). For example, host 402 may be assigned a name of "host1," while host 420 may be assigned a name of "host2" (see FIG. 4).

An address allocation server 440 assigns a name and a network address (e.g., IP addresses) to hosts (e.g., dynamically, statically) to each host or node. An example of the address allocation server 440 is a Dynamic Host Configuration Protocol (DHCP) Server. Address allocation server 440 includes a HCA 441 and a LANE driver 410C (along with work queue pairs to establish VI channels with other nodes).

A fabric manager 450 is provided to assign or map a local physical address (e.g., local MAC address) and fabric number to each HCA (or node) in the network 400. A node or host can be connected to more than one fabric. Therefore, the fabric number identifies the particular fabric, while the local physical address is unique within that fabric, according to an example embodiment. The name server 430 and the fabric manager 450 also include a HCA and a LANE driver (along with work queue pairs as well).

Each node includes a local physical address (e.g., local MAC address) as well as a global physical address (e.g., global Ethernet MAC address). The global physical address of an HCA is native to or compatible with the protocol stack of the host (e.g., TCP/IP stack 415). On the other hand, the local physical address (or local MAC address) of a HCA is native to or compatible with the HCA. The local physical address (e.g., local MAC address) is used by nodes in local network 400 to send messages or packets to other hosts/nodes in the network 400. According to an example embodiment, the address allocation (e.g., DHCP) server 440 can assign (or map) a network address (e.g., an IP address) and a name to each global physical address. There is typically one HCA per host or node. The address allocation (e.g., DHCP) server 440 can also provide a host with the address of the name server 450 (to be described below), typically in response to a query from a host/node. Although the name server 430 and the address allocation (e.g., DHCP) server 440 are shown as separate entities, these two servers may be provided as software programs which reside on separate computers or machines, or which reside on the same machine.

As well understood, the protocol stack (e.g., including TCP/IP stack 415) maintains a mapping from a network address (e.g., IP address) to a global physical address (e.g., 802.3 Ethernet MAC address) for each node or HCA. The HCA maintains a mapping from local physical address to VI channels (e.g., work queue pair numbers and queue pair bindings corresponding to each local physical address of other nodes).

The LANE driver 410 provides a mapping from a local physical address (used by the HCA) to a global physical address (used by the existing protocol stack 415) for each node or HCA. Thus, LANE driver 410 maps or converts a local physical address (local MAC address) to the corresponding global physical address (e.g., 802.3 MAC) when communicating with the protocol stack 415. The LANE driver 410 also converts or maps the global physical address (e.g., existing 802.3 MAC address) for a node to a corresponding local physical address of the node when communicating with the HCA. LANE driver 410 operates as an interface between the HCA and the existing protocol stack 415.

Figure 5:
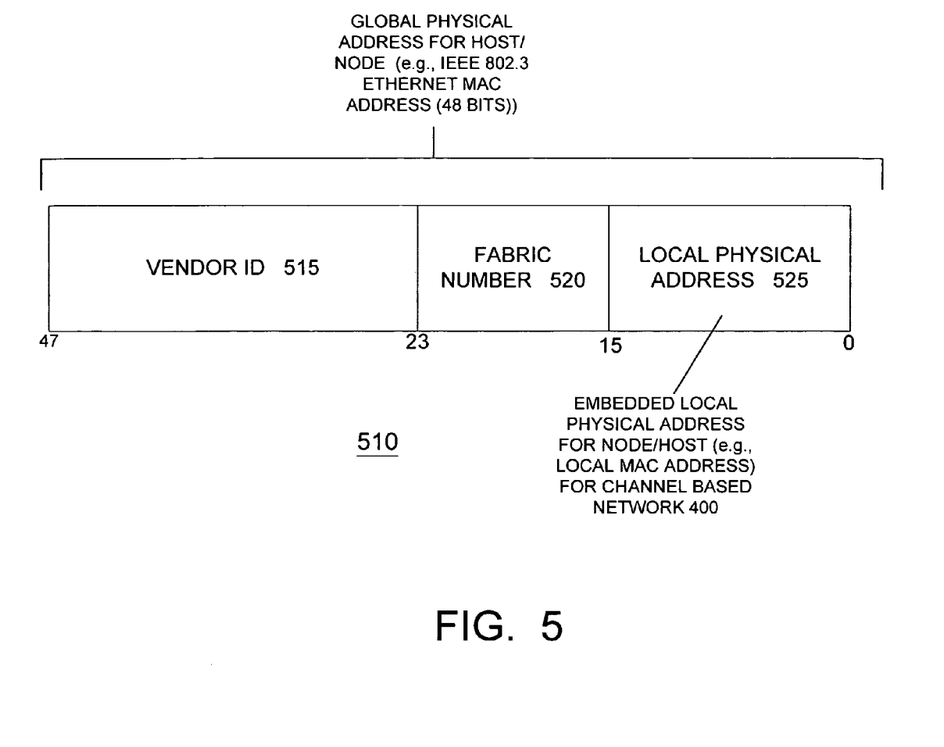
FIG. 5 is a block diagram illustrating a format of an example global or legacy physical address that includes an embedded local physical address for a channel based network according to an example embodiment.

FIG. 5 is a block diagram illustrating a format of an example existing or global physical address 510 that includes an embedded local physical address for a channel based network according to an example embodiment. A standard (or native or existing) IEEE 802.3 Ethernet MAC address (as an example global physical address) is 48 bits long, including a vendor ID 515 (24 bits) and a standard MAC address (24 bits) that is not used in this example. Instead, the 24 bits normally use the standard MAC address is used for a local MAC address (local physical address) and a fabric number. Therefore, according to an example embodiment, the global physical address 510 also includes a fabric number 520 and a corresponding local physical address 525 for the node or host. Thus, it can be seen that the fabric number 520 (e.g., 8 bits) and the local physical address (e.g., a 16-bit local MAC address) are embedded within the global physical address 510, according to an example embodiment. In such a case, the mapping or conversion performed by LANE driver 410 between a local physical address and a global physical address for a node is straightforward because the local address is provided as a portion (or subset) of the global physical address. Likewise, the global physical address 510 can be obtained for a node by simply concatenating the vendor ID 515 (known by LANE driver 410), the fabric number 520 and the local physical address 525. Alternatively, rather than embedding the local physical address, the local physical address may be mathematically calculated or ascertained based on the global address using a predetermined algorithm or function, and vice-versa.

Figure 6:
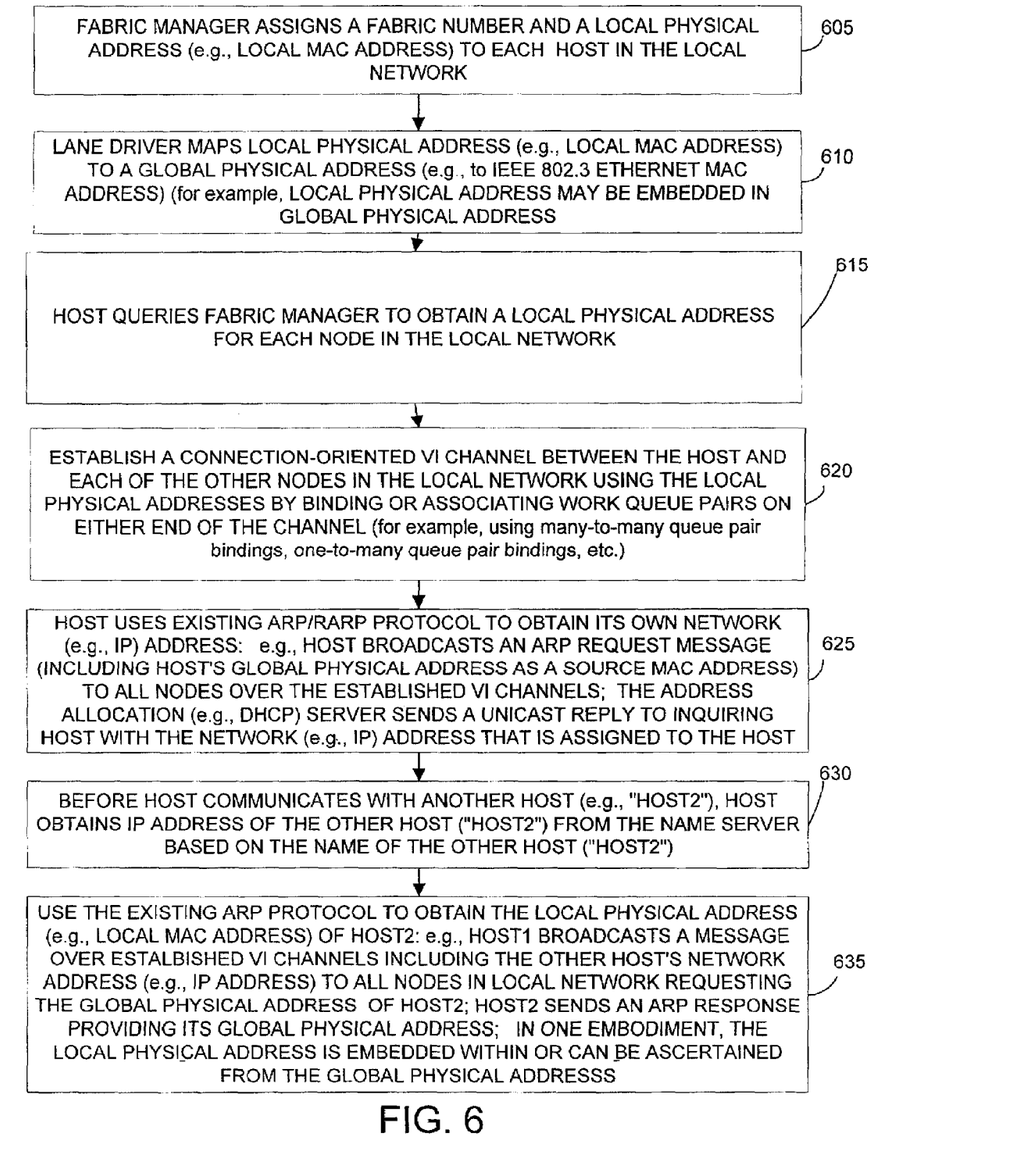
FIG. 6 is a flow chart illustrating an example operation according to an example embodiment.

FIG. 6 is a flow chart illustrating an example operation according to an example embodiment. At block 605, a host 402, FIG. 4 (for example), is connected to the fabric 230, and the fabric manager 450 sends a message to the host 402 assigning a local physical address 525 (e.g., a local MAC address) and a fabric number 520 to the host 402 (or to the host's HCA 210).

At block 610, the LANE driver 410 of host 402 maps the local physical address 525 (and the fabric number 520) assigned to the host 402 to a corresponding global physical address 510 (e.g., to a IEEE 802.3 Ethernet MAC address). One way in which this can be done is by embedding the local physical address 525 and fabric number 520 in the global physical address 510 as shown in FIG. 5. According to other techniques, mathematical algorithms or can be used to calculate the global physical address based on the local physical address. In any event, the global physical address 510 is determined or calculated based upon the corresponding local physical address 525.

At block 615, the host 402 queries the fabric manager 450 to obtain the local physical address to all other nodes connected to the local network 400.

At block 620, using the local addresses for each of the other nodes in the local network 400, the host 402 then establishes a connection-oriented VI channel between the host 402 and each of the other nodes (or a plurality of nodes) on local network 400 (e.g., to all nodes connected to fabric 230). Each VI channel can be established by binding a work queue pair at the host 402 to a work queue pair to each of the other nodes. A different work queue pair can be used at host 402 for each of the VI channels (a many-to-many queue pair bindings) or one work queue pair at host 402 can be bound to each of the different work queue pairs at the other nodes (a one-to-many queue pair bindings).

For example, at block 620, each VI channel can be established by sending and receiving connection management packets over the fabric 230 based on the local physical addresses (the network or IP address is not necessary). The connection management packets or messages can be sent to a well known work queue pair number of each node (e.g., to work queue pair 1). Also, the HCA 210 of host 402 maintains a local physical address-to-VI channel mapping for each of the other nodes attached to fabric 230 (e.g., maintains a mapping from a local physical address of the connected endpoint or node and the VI channel to communicate with the remote node (or the work queue pairs used for the VI channel). Likewise, each of the other nodes in local network 400 (including host 420, name server 430 and address allocation server 440) maintains a local physical address-to-VI channel mapping for each of the other nodes attached to fabric 230 (mapping the local physical address of the remote node to the VI channel used to communicate with that node).

According to an example embodiment, establishing a VI channel between a node and all other nodes on network 400 allows a message or packet to be broadcast (to all nodes) or multicast (i.e., sent to a selected group of nodes). Thus, when using connection-oriented VI channels, establishing a VI channel to each of the other nodes permits a LANE driver 410 to emulate a 802.3 LAN NIC to the protocol stack 415, even though the actual NIC is a HCA 210 (the HCA does not provide broadcast or multicast services).

At block 625, the host 402 uses an existing protocol (i.e., native to or compatible with the existing protocol stack 415), such as ARP or reverse ARP compatible with IEEE 802.3 (for example) to obtain its own network (e.g., IP) address. For example, the host 402 may broadcast the ARP request (including its own global physical address as the source MAC address) over each of the established VI channels to all other nodes in the local network 400 (or attached to fabric 230). The address allocation (e.g., DHCP) server 440 recognizes the request as an ARP request, assigns a network (e.g., IP) address to host 402, and then sends a unicast ARP response (including the network (e.g., IP) address assigned to host 402) back to host 402. To do this, the LANE driver 410C resolves the global physical address of host 402 to the local physical address for host 402 (e.g., the local address may be embedded in the global address or ascertainable therefrom), while the HCA 441 (or software residing at server/host 440) then resolves the local physical address of host 402 to the VI channel already established between the host 402 and the address allocation server 440 (this VI channel was established at block 620).

Now, the host 402 has its own local physical address and fabric number, which map to its own global physical address. The host 402 also has its own network address (e.g., IP address). Host 402 also knows its own name (the name of host 402 is "HOST1"). We shall also assume that host 402 would like to communicate with another host or node (host 420 in this example) on network 400, and has the name of this other node. In this example. The name of host 420 is "HOST2." To communicate to "HOST2" (host 420) over the local network 400, the host 402 must acquire the local physical address for "HOST2."

Therefore, at block 630, host 402 sends a request message (including the name "HOST2") to the name server 430 requesting the network address (e.g., IP address) corresponding to the name "HOST2." As noted above, the name server 430 maintains a mapping or correspondence between network names and network addresses (e.g., IP addresses) for the nodes on network 400.

At block 635, host 402 uses the existing or native protocol (e.g., native to the protocol stack 415) to obtain the global physical address corresponding to the IP address of "HOST2" (of host 420). Host 402 can do this by broadcasting an ARP request message or packet to each node in the network via the established VI channels (established in block 620). The protocol stack 415B of host 420 matches the network address (e.g., IP address) in the ARP request packet to its own network address and responds by providing an ARP response to the host 402. The ARP request from host 402 included the global physical address and the network address of the host 402 (of "HOST1").

To send the ARP response to host 402, the LANE driver 410B maps the network address of host 420 (of HOST2) to the global physical address of host 420. The LANE driver 410B then maps (or converts) the global physical address of host 420 to the local physical address of host 420 (e.g., the local physical address may be embedded in the global physical address). HCA 222 (or another software element in host 420) then maps the local physical address to the corresponding VI channel to communicate with host 402. The ARP response (including the global physical address of host 420) is then sent by the HCA 222 of host 420 to host 402. Host 402 then determines or calculates the local physical address and fabric number of host 420 (name="HOST2") based on the global physical address of host 420. LANE driver 410A of host 402 stores a local physical address to global physical address of host 420. The HCA 210 (or a software element at host 402) had previously stored (at block 620) a mapping from the local physical address of host 420 to the VI channel used to communicate with host 420 (the VI channel between hosts 402 and 420).

Host 402 may now communicate with host 420 by sending messages to host 420 using the global (i.e., legacy) physical address of host 420, which the LANE driver 410A then maps to a local physical address of host 420, which the HCA 210 (or a software element) then maps to a corresponding VI channel. The message (e.g., read, write, request for status information or data) can then be sent from host 402 to host 420 via the connection oriented VI channel that couples or connects host 402 and host 420.

As described above, the present invention provides a number of advantages. A few of these advantages will be briefly mentioned here. According to an example embodiment, the use of a virtual interface (VI) channel between each node avoids calls to the OS kernel and multiple buffer copies. Also, a separate ARP protocol is not required where the local physical address is embedded within the legacy or global physical address. Each host includes a LANE driver to allow LAN emulation over the connection oriented VI channel based network, without reliance upon a single point emulation service or interface.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An apparatus at a node in a network comprising:
   a first work queue pair comprising descriptors to describe data to be transmitted from a first node to a remote node of a local network and to describe where to store data received from the remote node to establish a connection-oriented virtual interface (VI) channel between the first node and the remote node in the local network based on a local physical address of the remote node, wherein the remote node comprises a second work queue pair and wherein the connection-oriented VI channel is established by associating the first work queue pair with the second work queue pair;
   a channel adapter coupled to the first work queue pair, the channel adapter to interface a host to a switched fabric; and
   an emulation driver coupled to the channel adapter, the emulation driver mapping a legacy physical address to the local physical address of the remote node of the local network, the channel adapter mapping the local physical address of the remote node to the established connection-oriented VI channel to communicate with the remote node;
   wherein the local physical address of the remote node is embedded or provided within the legacy physical address of the remote node.

2. The apparatus of claim 1 wherein the legacy physical address comprises a MAC address for use in an existing or legacy network.

3. The apparatus of claim 1 wherein the legacy physical address comprises a IEEE 802.3 Ethernet MAC address.

4. The apparatus of claim 1 and further comprising a protocol stack coupled to the emulation driver, the protocol stack implementing a legacy protocol and mapping a network address to a legacy physical address for each of a plurality of nodes.

5. A node apparatus comprising:
   a channel adapter to interface a host to a switched fabric;
   an emulation driver coupled to the channel adapter, the emulation driver mapping a first physical address of a remote node to a second physical address of the remote node, the channel adapter mapping the second physical address of the remote node to a channel to communicate with the remote node, wherein the second physical address is embedded within the first physical address; and
   a first virtual interface (VI) work queue pair coupled to the host to establish a VI channel between the host and the remote node of the local network, wherein the first work queue pair comprises descriptors to describe data to be transmitted to the remote node and to describe where to store data received from the remote node, wherein the remote node comprises a second work queue pair and wherein the VI channel is established by associating the first work queue pair with the second work queue pair.

6. The apparatus of claim 5 wherein first physical address comprises a legacy or global physical address, and wherein the second physical address comprises a local physical address.

7. The apparatus of claim 6 wherein the legacy physical address comprises a MAC address for use in an existing or legacy network.

8. The apparatus of claim 6 wherein the legacy physical address comprises a IEEE 802.3 Ethernet MAC address.

9. The apparatus of claim 6 wherein the local physical address can be used by the node apparatus for communication with other nodes on the local network.

10. The apparatus of claim 5 wherein the channel adapter comprises an ATM NIC for interfacing to an ATM network.

11. The apparatus of claim 5 wherein the channel adapter comprises a host channel adapter.

12. A method comprising:
    establishing a connection-oriented virtual interface (VI) channel between a first node and each of multiple other nodes in a network based on local physical addresses of the other nodes using a first work queue pair at the first node and multiple work queue pairs at each of the multiple other nodes, wherein the first work queue pair comprises descriptors to describe data to be transmitted and to describe where to store received data, and wherein the connection-oriented VI channel is established by associating the first work queue pair with each of the multiple other work queue pairs; and
    determining a first physical address to a network address correspondence for a node of the network using a single address resolution protocol (ARP) and determining a first physical address to a second physical address correspondence for the node in the network, wherein the second physical address is embedded or provided within the first physical address.

13. The method of claim 12 wherein the first physical address comprises a legacy or global physical address, while the second physical address comprises a local physical address.

14. The method of claim 13 wherein the legacy physical address comprises a MAC address for use in an existing or legacy network.

15. The method of claim 13 wherein the legacy physical address comprises a IEEE 802.3 Ethernet MAC address.

16. The method of claim 13 wherein the network address comprises an (Internet Protocol) IP address.

17. A method comprising:
    obtaining a local physical address for a first node of a network;
    obtaining a legacy or global physical address for the first node based on the local physical address of the first node;
    obtaining a local physical address for one or more other nodes in the network;
    establishing a connection-oriented virtual interface (VI) channel between the first node and each of the one or more other nodes in the network based on local physical addresses of the other nodes using a work queue pair, wherein the work queue pair comprises descriptors to describe data to be transmitted and to describe where to store received data;
    using a legacy protocol to broadcast a request message over each of the established VI channels to obtain a network address of the first node;
    wherein the local physical address of each node is embedded or provided within the legacy or global physical address of the node.

18. The method of claim 17 and further comprising:
    using the legacy protocol to obtain a global physical address corresponding to a network address of a selected one of the other nodes;
    determining the local physical address based on the global address of the selected one of the other nodes.

19. The method of claim 17 wherein the network address comprises an IP address.

20. The method of claim 17 wherein the establishing a connection-oriented VI channel comprises establishing a many-to-many work queue bindings between the first node and the one or more other nodes in the network.

21. The method of claim 17 wherein the establishing a connection-oriented VI channel comprises establishing a one-to-many work queue bindings between the first node and the one or more other nodes, respectively, in the network.

22. A method comprising:
    establishing a virtual interface (VI) channel between a first node and each of a plurality of other nodes in the network using a work queue pair, wherein the work queue pair comprises descriptors to describe data to be transmitted and to describe where to store received data;
    using a legacy protocol to broadcast a request message over the VI channels including a network address;
    receiving a response message including a global or legacy physical address corresponding to the network address;
    determining a local physical address corresponding to the legacy physical address based on the legacy physical address without use of a specialized address request protocol;
    wherein the local physical address is embedded within the global or legacy address of the node.

23. The method of claim 22 wherein the establishing a VI channel comprises establishing a many-to-many work queue bindings between the first node and the plurality of other nodes in the network.

24. The method of claim 22 wherein the establishing a VI channel comprises establishing a one-to-many work queue bindings between the first node and the plurality of other nodes, respectively, in the network.

25. A method of communicating a message over a channel based network comprising:
    obtaining a local physical address for a first node of a network;
    obtaining a legacy or global physical address for the first node based on the local physical address of the first node;
    obtaining a local physical address for a second node in the network;
    establishing a connection-oriented virtual interface (VI) channel between the first node and the second node based on the local physical address of the second node using a work queue pair;
    generating a message to be sent to the second node, the second node including a global or legacy physical address;
    mapping the global physical address of the second node to a local physical address of the second node;
    mapping the local physical address of the second node to the VI channel established between the first and second nodes;

sending the message to the second node over the established VI channel;

wherein the local physical address is embedded in the global physical address of the second node.

26. A method of broadcasting or multicasting a message over a channel based network comprising:

obtaining a local physical address for a first node of a network;

obtaining a legacy or global physical address for the first node based on the local physical address of the first node;

obtaining a local physical address for a plurality of second nodes in the network;

establishing a virtual interface (VI) channel between the first node and each of the plurality of second nodes based on the local physical address of the plurality of second nodes using a work queue pair, wherein the work queue pair comprises descriptors to describe data to be transmitted and to describe where to store received data;

generating a message to be sent;

sending the message from the first node to each of the second nodes via each of the established VI channels;

wherein the local physical address is embedded in the global physical address of the second node.

* * * * *